B. F. BARNEY.
CORN HARVESTER.

No. 89,546. Patented May 4, 1869.

Witnesses.
H. F. Eberts
Jas. J. Day

Inventor.
B. F. Barney
Per Attorney
Thos. S. Sprague

B. F. BARNEY.
CORN HARVESTER.

Patented May 4, 1869.

Witnesses.
H. F. Eberts
Jas. S. Day

Inventor.
B. F. Barney
Per Attorney
Thos. S. Sprague

United States Patent Office.

BENJAMIN F. BARNEY, OF PONTIAC, ILLINOIS.

Letters Patent No. 89,546, dated May 4, 1869.

IMPROVEMENT IN CORN-HARVESTERS.

The Schedule referred to in these Letters Patent and making part of the same.

*To whom it may concern:*

Be it known that I, BENJAMIN F. BARNEY, of Pontiac, in the county of Livingston, and State of Illinois, have invented a new and useful Improvement in Machines for Harvesting Corn; and I do declare that the following is a true and accurate description thereof, reference being had to the accompanying drawings, and to the letters of reference marked thereon, and being a part of this specification, in which—

Like letters indicate like parts in each figure.

Figure 1:
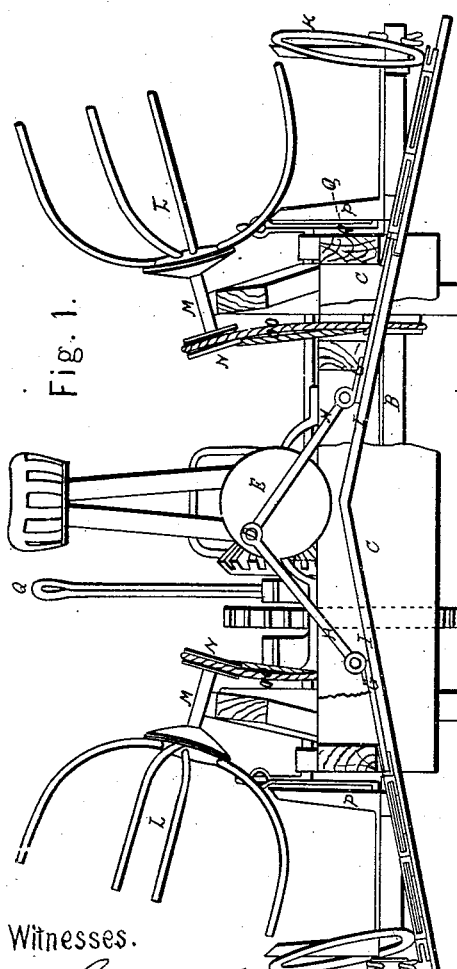
Figure 1 is a front elevation of my corn-harvester, showing the angles of the reels and knives, and their positions.
Figure 2:
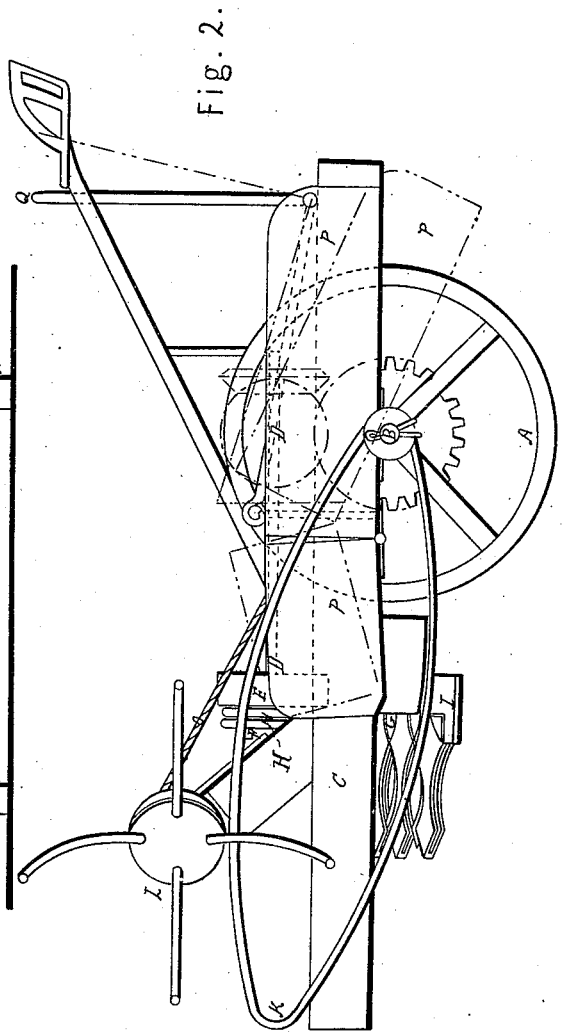
Figure 2 is a side elevation, showing the operation of the dropper-boxes.
Figure 3:
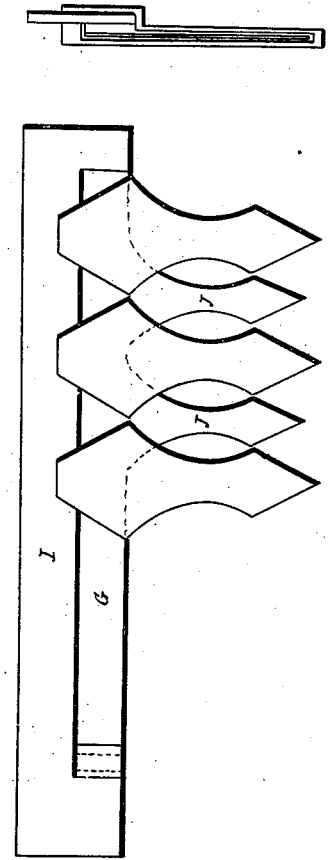
Figure 3 is a plan view of the knives and cutter-bars.

The nature of this invention relates to an improvement in machines for cutting standing corn, and consists in the peculiar shape of the sickles, and the manner in which they are operated; in the arrangement of the reels for holding the corn to the cutters, and guiding in into the dropper-boxes; in a peculiar dropper for discharging the corn after the same is cut, in bundles ready for gathering up; and in the new, novel, and peculiar arrangement of its parts, as hereinafter more fully shown and set forth.

J represents knives, or sickles, which are of the form and shape shown, as are also the guards, for the purpose of allowing the corn-stalks to enter freely to the base of the sickles, where they are easily cut in two, and so that if there should be two or more stalks springing from one root, and the first stalk should fill the space between the sickle and the adjoining guard at the base, that the points of the sickles would cut off the second stalk.

K are guards for guiding the corn to the cutters, and compel it to fall into the dropper-boxes after it is cut.

L are reels, consisting of a series of metallic arms, curved as shown, and secured to a shaft revolving in the bearings M, which shaft is provided with a grooved pulley, N, from which motion is communicated from the shaft B through a belt, O; one of these reels being placed at each side, and have their shafts inclined upward and forward, so that the front arms of each reel will travel inward and away from the corn, and not strike the stalk until it is just ready to be cut by the sickles, when their further travel will compel the cut stalks to fall into the dropper-boxes P, which, when sufficient corn is gathered therein, are tilted up, and the corn falls in a heap on the ground, by the lever, or bell-crank Q, whose upper end is placed in convenient reach of the driver in his seat.

It is evident that should the entire box be tilted, while its forward end was up, a portion of the corn cut would fall on to the cutter-bar, and from thence on the ground.

To overcome this difficulty, the dropper-box is divided into two parts, the front and shorter part being hinged to the other, in such a manner that the front end will not rise, but simply slide backward a short distance, when the main portion is tilted.

If any considerable inclination be given the reel-shafts, or if it be desired to run them in a direction oblique to that of the shaft B, the said reels may be operated by a tumbling-rod and knuckle-joint, or with bevel-gearing from the shaft B.

The machine is intended to run between two rows of corn, in such a manner that the two rows will be cut at one passage of the implement, the width of the same being calculated to accomplish that purpose.

It is desirable that the edges of the sickle-guards should be bevelled to a shear-edge, the better to afford a resistance to the cutting-edges of the knives.

What I claim as my invention, and desire to secure by Letters Patent, is—

The combination and arrangement of the inclined knives J, guards K, reels L, hinged dropper-box P, and lever Q, in the manner described for the purpose set forth.

B. F. BARNEY.

Witnesses:
WM. J. MURPHY,
LUCIUS WINSTON.